(12) United States Patent
Plessers

(10) Patent No.: US 7,488,350 B2
(45) Date of Patent: Feb. 10, 2009

(54) CARRIER TUBE FOR SENSORS

(75) Inventor: Jacques Plessers, Houthalen-Helchteren (BE)

(73) Assignee: Heraeus Electro-Nite International N.V., Houthalen (BE)

( * ) Notice: Subject to any disclaimer, the term of this patent is extended or adjusted under 35 U.S.C. 154(b) by 115 days.

(21) Appl. No.: 11/012,903

(22) Filed: Dec. 15, 2004

(65) Prior Publication Data

US 2005/0132827 A1 Jun. 23, 2005

(30) Foreign Application Priority Data

Dec. 17, 2003 (DE) .................. 103 59 449

(51) Int. Cl.
*G01N 1/12* (2006.01)

(52) U.S. Cl. .................................. 73/864.59

(58) Field of Classification Search ............ 73/864.53, 73/864.54, 864.55, 864.56, 864.57, 864.58, 73/864.59; 266/99
See application file for complete search history.

(56) References Cited

U.S. PATENT DOCUMENTS

| | | | | |
|---|---|---|---|---|
| 3,369,406 A | * | 2/1968 | Lowdermilk et al. ..... | 73/864.52 |
| 3,444,109 A | | 5/1969 | Golick et al. | |
| 3,775,145 A | * | 11/1973 | Ware et al. ............... | 106/128.1 |
| 3,877,309 A | * | 4/1975 | Hance ...................... | 73/864.57 |
| 3,941,634 A | * | 3/1976 | Nisser et al. .................. | 156/79 |
| 4,181,767 A | * | 1/1980 | Steinau ....................... | 428/219 |
| 4,361,151 A | * | 11/1982 | Fitzgerald .................... | 604/15 |
| 4,468,009 A | | 8/1984 | Clauss et al. | |
| 4,521,639 A | * | 6/1985 | Falk ........................... | 136/234 |
| 4,566,343 A | * | 1/1986 | Theuwis et al. .......... | 73/864.59 |
| 4,662,614 A | | 5/1987 | Larsson | |
| 4,692,556 A | | 9/1987 | Bollen et al. | |
| 4,855,354 A | * | 8/1989 | Mohler et al. ............ | 525/54.24 |
| 4,875,380 A | * | 10/1989 | Boron ....................... | 73/864.58 |
| 4,896,549 A | * | 1/1990 | Falk ........................ | 73/864.53 |
| 5,163,725 A | * | 11/1992 | Leweallyn .................. | 294/1.1 |
| 5,168,764 A | * | 12/1992 | Falk ........................ | 73/864.59 |
| 5,435,196 A | | 7/1995 | Cassidy | |
| 5,709,474 A | | 1/1998 | Richardson et al. | |
| 6,022,450 A | * | 2/2000 | Van Kessel et al. ......... | 162/174 |
| 6,227,702 B1 | | 5/2001 | Yamada et al. | |
| 6,390,428 B1 | * | 5/2002 | Oshima ...................... | 248/266 |
| 6,638,549 B1 | * | 10/2003 | Lloyd .......................... | 426/115 |

FOREIGN PATENT DOCUMENTS

| | | |
|---|---|---|
| CN | 1188695 | 7/1998 |
| DE | 12 74 379 B | 8/1968 |
| DE | 2 236 966 A1 | 2/1973 |
| DE | 75 076 05 U1 | 10/1975 |

(Continued)

OTHER PUBLICATIONS

Samsonow et al., "Nichtmettallene Thermopaare und Schutzrohre", *VDI-Z*, vol. 111, pp. 1337-1342, (1969).

*Primary Examiner*—Robert R Raevis
(74) *Attorney, Agent, or Firm*—Panitch Schwarze Belisario & Nadel LLP

(57) ABSTRACT

A carrier tube is provided for sensors for taking measurements in metal or cryolite melts, especially in cast iron, steel, or copper melts. The carrier tube is formed from a mixture of a plant fiber material with starch and/or protein.

5 Claims, 1 Drawing Sheet

FOREIGN PATENT DOCUMENTS

| | | |
|---|---|---|
| EP | 0 128 665 A2 | 12/1984 |
| EP | 0 477 203 B1 | 9/1993 |
| EP | 0 712 428 B1 | 3/1998 |
| FR | 2 181 933 | 12/1973 |
| GB | 1155427 | 6/1969 |
| GB | 1 488 052 A | 10/1977 |
| GB | 1 492 268 | 11/1977 |
| GB | 1 492 268 A | 11/1977 |
| JP | 60238080 A | 11/1985 |
| JP | 63081264 | 4/1988 |
| JP | 01041824 | 2/1989 |
| WO | WO 90/14935 A1 | 12/1990 |
| WO | WO 95/04111 A1 | 2/1995 |

* cited by examiner

CARRIER TUBE FOR SENSORS

BACKGROUND OF THE INVENTION

The invention relates to a carrier tube for sensors for taking measurements in metal or cryolite melts, especially in cast iron, steel, or copper melts.

From German Utility Model No. DE 75 07 605 U1 an insulating sleeve for measurement lances is known, which is formed from a compressed mixture of cellulose and a binding agent. The cellulose material comprises substantially wood fibers or wood chips.

Objects which are pressed or extruded from wood fibers have been known for a long time and are used in daily life as boards in buildings, door leaves, structural elements, insulation, or even as packaging material, and for a whole array of other applications. Such boards and molded parts are known, for example, from International patent application publications WO 90/14935 A1 or from WO 95/04111 A1.

In process measurement technology in metallurgical plants, measurement probes are regularly required in large numbers for continuous testing of the quality of the molten metal. For this purpose, sensors are predominantly used which are immersed into the high-temperature melt. These sensors are consumed after one measurement and are replaced by new sensors for the next measurement. The sensors are typically held on tubes made of cardboard. These tubes are at least partially burned up and are unusable after the measurement.

There is a need for economical carriers for sensors in aggressive high-temperature melts. On the one hand these carriers should exhibit sufficient durability to enable the desired measurement, and on the other hand they should be able to be disposed of in an environmentally friendly way.

BRIEF SUMMARY OF THE INVENTION

These objectives are achieved according to the invention, in that the carrier tube described at the outset is formed from a mixture of a plant fiber material with starch and/or protein. The mixture is compressed or extruded. Such a carrier tube comprises natural or near-natural material and therefore can be disposed of in an environmentally friendly way. Surprisingly, the carrier tube also has proven to have sufficient temperature stability to withstand high temperatures up to about 1700° C., at least in such a condition during the taking of the measurement values that the measurement and transmission of the measurement signals can be performed.

BRIEF DESCRIPTION OF THE DRAWING

The foregoing summary, as well as the following detailed description of the invention, will be better understood when read in conjunction with the appended drawing. For the purpose of illustrating the invention, there is shown in the drawing an embodiment which is presently preferred. It should be understood, however, that the invention is not limited to the precise arrangements and instrumentalities shown. In the drawing.

DETAILED DESCRIPTION OF THE INVENTION

Figure 1:
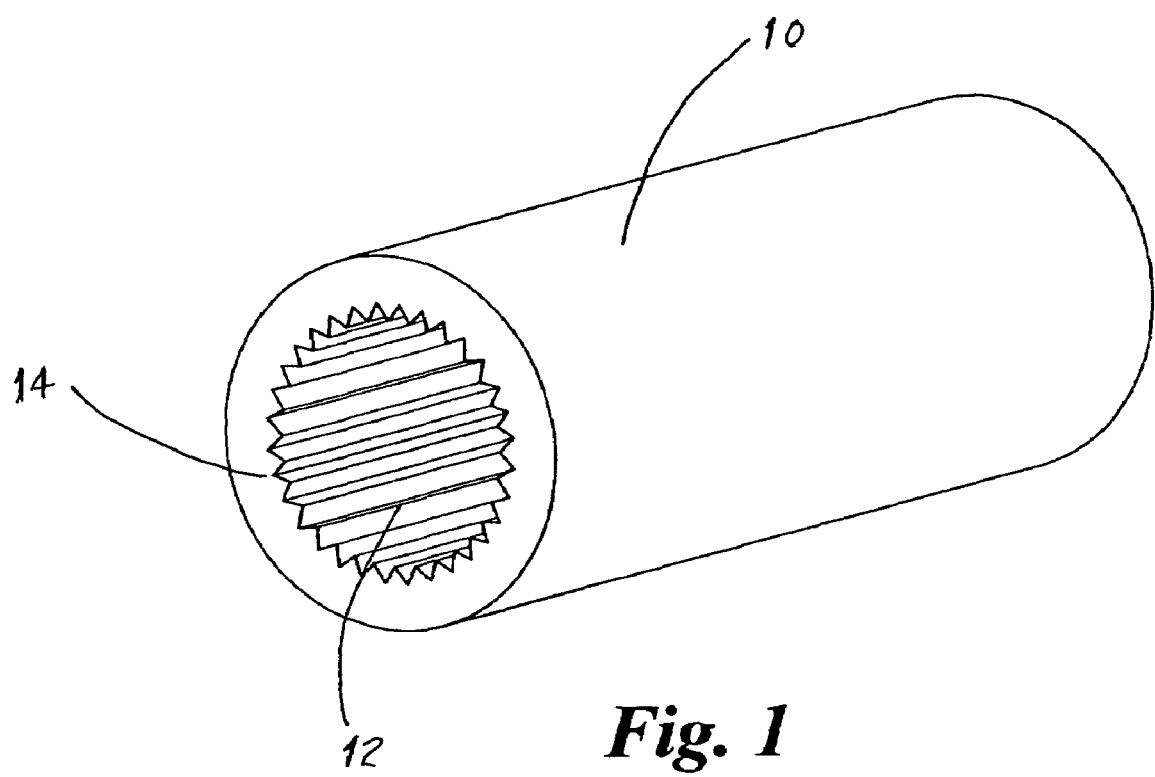
FIG. 1 is a perspective view of a carrier according to one embodiment of the invention, showing the inner side surface projections.

Preferably, the plant fiber material is formed on a wood and/or cellulose basis. In particular, it is advantageous if the wood is present as chips or wood pulp. It can be expedient if the carrier tube also contains plastic and/or a lubricant. The plastic can preferably be polypropylene, polyvinyl chloride, polyethylene, or the like. Recycled plastic can also be used. The plastic serves for improving the mechanical properties, especially increasing the rupture strength, so that, to the greatest extent possible, the carrier tube is not damaged, especially during use before immersion in the melt.

The proportion of the plant fiber material in the mixture is at least a predominant portion (i.e., greater than about 50 wt %) of the mixture and preferably up to approximately 70 wt %, the proportion of starch and/or protein is approximately 3-30 wt %, and the proportion of plastic and/or lubricant is approximately 1-15 wt %, as a preferred composition, all wt % being given as the percent by weight of the total mixture.

It is expedient if the carrier tube has on its inner side surface projections, especially ribs, knobs, or beads, which allow better fixation of the measurement head, which is mounted in one end of the carrier tube. As shown in FIG. 1, a carrier tube 10 of the invention has projections 12, in this case ribs, on the inside surface of the tube for holding a measurement head (not shown) mounted in the open end 14 of the carrier tube. The ribs or other projections need only extend a short distance from the end of the tube toward the inside of the tube, i.e., sufficient to engage the length of the measurement head, but for ease of manufacture, particularly extrusion of the tube, it is preferred to have the ribs or other projections extend along the entire length of the tube.

The carrier tube can be manufactured by an extrusion method. Such carrier tubes have a surprisingly good resistance relative to liquid metal. They withstand the high temperature longer than cardboard tubes do, and they do not remain fixed to a lance, as they are typically used in order to hold the carrier tube upon immersion into the hot melt.

In the following, one embodiment of the invention is described.

The carrier tube according to the invention can be extruded in sizes typical to the art from a mixture of approximately 70 wt % wood chips, approximately 27 wt % malt as binding agent, and an additive of polypropylene and a lubricant in a total amount of approximately 3 wt %. As the lubricant, standard lubricants for polyolefins and PVC can be used, such as ethylene-bis-stearamide, zinc stearate, paraffin wax, or fatty acid-based lubricants, such as metal stearate, amide, or ester, as well as fluoroelastomers. The inside of the extruded tube is provided with ribs as shown in FIG. 1, so that a measurement head to be held in the tube is pressed into a tube end and held under pressure (force fit) between opposing ribs.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A carrier tube for sensors, the carrier tube being configured to carry a sensor during the acquisition and transmission of measurements from a metal or cryolite melt, wherein the tube comprises a mixture of a plant fiber material with starch and/or protein, and has a temperature stability sufficient to withstand cast iron, steel, or copper melts or cryolite melts such that acquisition and transmission of the measurements can be performed, wherein the tube has projections on an inner surface thereof, the projections being in the form of ribs.

2. The carrier tube according to claim 1, wherein the plant fiber material comprises wood and/or cellulose.

3. The carrier tube according to claim 2, wherein the wood comprises chips and/or wood pulp.

4. The carrier tube according to claim 1, wherein the plant fiber material is present in the mixture in a proportion of greater than about 50 wt % to approximately 70 wt % of the total mixture.

5. The carrier tube according to claim 1, wherein the starch and/or protein is present in the mixture in an amount of approximately 3-30 wt % and the mixture includes plastic and/or lubricant in an amount of approximately 1-15 wt %, based on the total weight of the mixture.

* * * * *